(12) United States Patent
Chen et al.

(10) Patent No.: US 8,602,366 B2
(45) Date of Patent: Dec. 10, 2013

(54) SUPPORTING BRACKET FOR COMPUTER MONITOR

(75) Inventors: Yun-Lung Chen, New Taipei (TW); Liang-Chin Wang, New Taipei (TW); Gang Su, Wuhan (CN); Ling-Xin Zeng, Wuhan (CN); Zhong-Jie Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/419,486

(22) Filed: Mar. 14, 2012

(65) Prior Publication Data

US 2013/0026311 A1    Jan. 31, 2013

(30) Foreign Application Priority Data

Jul. 27, 2011    (CN) .......................... 2011 1 0211799

(51) Int. Cl.
| | | |
|---|---|---|
| *A47F 5/00* | (2006.01) | |
| *A47F 7/00* | (2006.01) | |
| *F16M 11/00* | (2006.01) | |
| *F16M 13/00* | (2006.01) | |
| *F16L 3/00* | (2006.01) | |
| *F16L 3/08* | (2006.01) | |
| *E04G 3/00* | (2006.01) | |
| *A47B 43/00* | (2006.01) | |
| *A47B 47/00* | (2006.01) | |
| *A47B 57/00* | (2006.01) | |
| *B25G 3/36* | (2006.01) | |

(52) U.S. Cl.
USPC .................. 248/125.7; 248/125.1; 248/121; 248/74.2; 248/282.1; 248/917; 211/206; 211/207; 403/384

(58) Field of Classification Search
USPC ............. 248/121, 122.1, 125.1, 125.2, 125.7, 248/176.3, 917, 920, 411, 412, 413, 161, 248/406.1; 403/384, 386, 398; D14/452, D14/448, 451, 457, 460, 432, 439, 447; 285/18; 211/106, 107
IPC .................................................. A47F 5/00,7/00
See application file for complete search history.

(56) References Cited

U.S. PATENT DOCUMENTS

| | | | | |
|---|---|---|---|---|
| 2,455,525 A | * | 12/1948 | Schulz ...................... 248/188.5 |
| 3,306,639 A | * | 2/1967 | Lyon .............................. 403/107 |
| 4,687,167 A | * | 8/1987 | Skalka et al. ................. 248/126 |
| 5,011,104 A | * | 4/1991 | Fang ......................... 248/125.8 |
| 5,433,551 A | * | 7/1995 | Gordon ........................ 403/377 |
| 5,492,430 A | * | 2/1996 | Jones ........................ 403/109.5 |
| 5,499,430 A | * | 3/1996 | Strazar ............................ 24/279 |
| 6,761,274 B1 | * | 7/2004 | Chen ............................. 211/207 |

(Continued)

*Primary Examiner* — Daniel J Troy
*Assistant Examiner* — Muhammad Ijaz
(74) *Attorney, Agent, or Firm* — Altis Law Group, Inc.

(57) ABSTRACT

A supporting bracket for a monitor includes a stand and a control structure. The stand comprises a pole. The control structure comprises a installation member, a clamping member, a resilient member and a control member. The installation member comprises an installation portion in which an installation hole is defined. The clamping member is engaged in the installation hole and against the pole. The resilient member is sandwiched between the inside wall of the installation portion and the clamping member. The control member is installed in the installation member. The control member is rotatable relative to the installation member to modulate a friction between the pole and the clamping member.

5 Claims, 4 Drawing Sheets

(56) References Cited

U.S. PATENT DOCUMENTS

| | | | |
|---|---|---|---|
| 6,779,767 B2* | 8/2004 | Kuhn | 248/276.1 |
| 7,077,277 B2* | 7/2006 | Wang | 211/206 |
| 7,264,212 B2* | 9/2007 | Hung | 248/282.1 |
| 7,290,742 B2* | 11/2007 | Wang | 248/200.1 |
| 7,467,775 B2* | 12/2008 | Lu et al. | 248/663 |
| 7,806,378 B2* | 10/2010 | Oddsen, Jr. | 248/280.11 |
| 8,152,124 B2* | 4/2012 | Branham | 248/475.1 |
| 8,162,268 B1* | 4/2012 | Huang | 248/124.1 |
| 8,197,154 B2* | 6/2012 | Broering et al. | 403/165 |
| 8,282,052 B2* | 10/2012 | Huang | 248/125.1 |
| 8,453,980 B2* | 6/2013 | Sapper et al. | 248/125.7 |
| 2002/0011544 A1* | 1/2002 | Bosson | 248/121 |
| 2002/0088907 A1* | 7/2002 | Phillips | 248/157 |
| 2006/0065795 A1* | 3/2006 | Blackburn | 248/122.1 |
| 2007/0145202 A1* | 6/2007 | Hsieh | 248/161 |
| 2007/0290568 A1* | 12/2007 | Ihle et al. | 310/257 |
| 2007/0295878 A1* | 12/2007 | Smed | 248/413 |
| 2008/0011924 A1* | 1/2008 | Li | 248/309.1 |
| 2008/0068784 A1* | 3/2008 | Bouissiere | 361/681 |
| 2009/0078841 A1* | 3/2009 | Oddsen, Jr. | 248/279.1 |
| 2009/0146090 A1* | 6/2009 | Hashimoto et al. | 251/25 |
| 2009/0256047 A1* | 10/2009 | Zhao et al. | 248/408 |
| 2012/0098250 A1* | 4/2012 | Chang et al. | 285/18 |
| 2013/0021539 A1* | 1/2013 | Austin et al. | 348/836 |
| 2013/0026312 A1* | 1/2013 | Wang et al. | 248/125.7 |

* cited by examiner

SUPPORTING BRACKET FOR COMPUTER MONITOR

BACKGROUND

1. Technical Field

The present disclosure relates to supporting brackets, and particularly to a supporting bracket for a computer monitor.

2. Description of Related Art

In a computer system, a monitor is configured to be secured to a supporting bracket. The monitor can be conveniently adjusted up and down. However, users may need to adjust the monitor to a right direction or a left direction, in most cases the whole supporting bracket will need to be moved for this type of adjustment.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
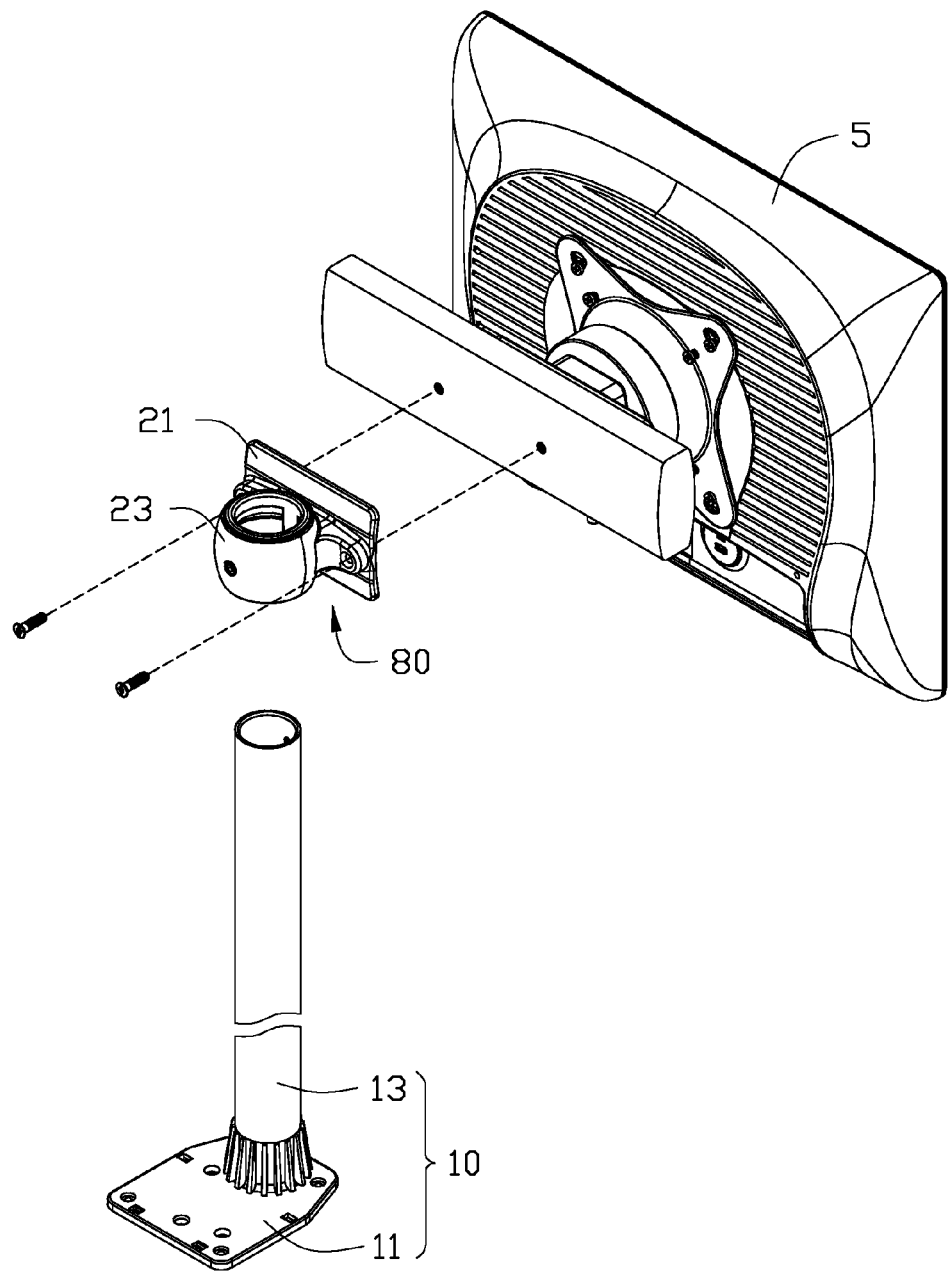
FIG. 1 is a partially exploded, isometric view of an embodiment of a supporting bracket and a monitor.

FIG. 1, shows a supporting bracket in accordance with an embodiment that is configured to support a monitor 5. The supporting bracket comprises a stand 10 and a control structure 80.

The stand 10 comprises a body 11 and a pole 13 connected to the body 11. In one embodiment, the pole 13 is a hollow column.

Figure 2:
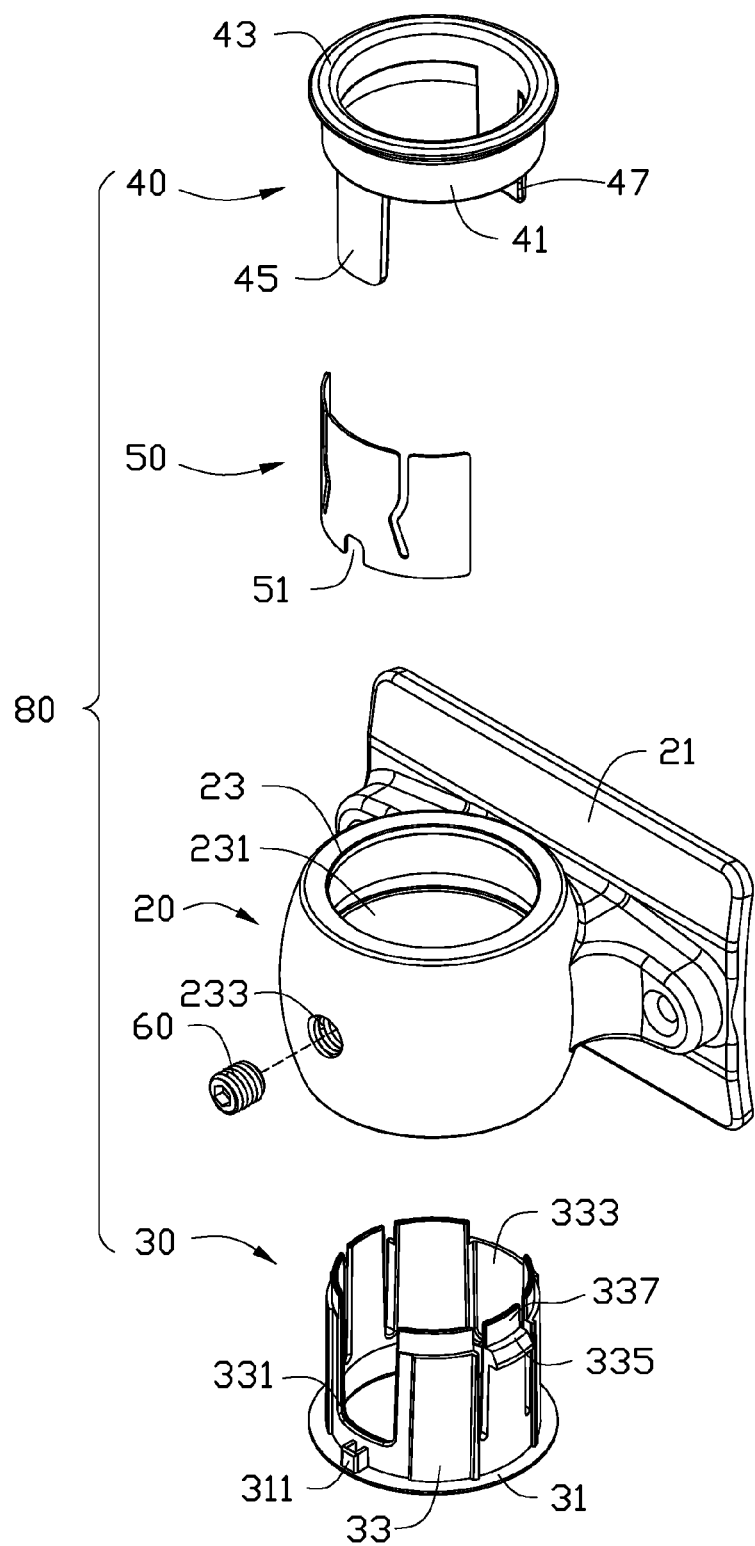
FIG. 2 is an exploded, isometric view of a control structure of FIG. 1.

FIG. 2, shows the control structure 80 comprising an installation member 20, a blocking member 30, a clamping member 40, a resilient member 50 and a control member 60. In one embodiment, the control member 60 is a screw.

Figure 4:
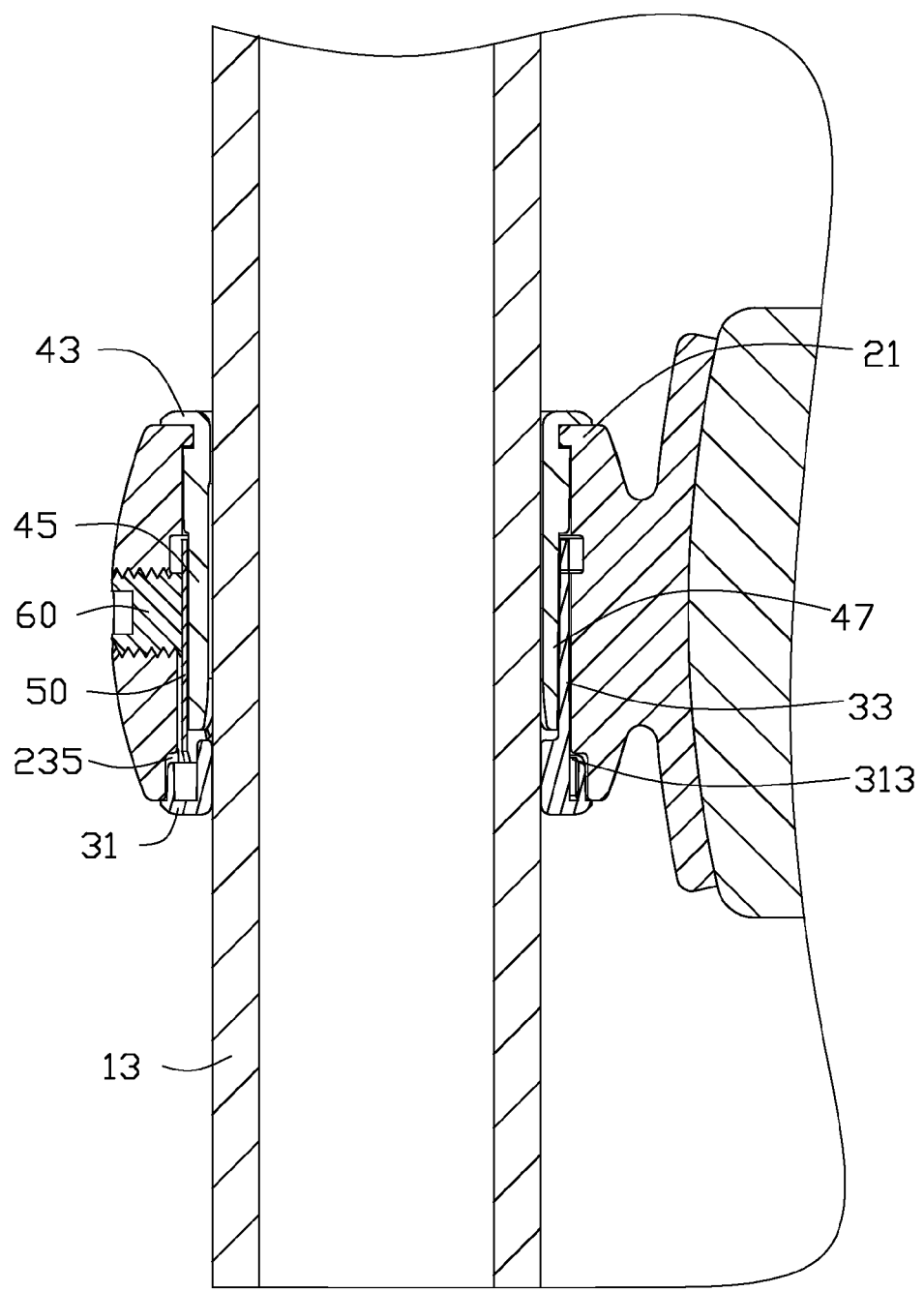
FIG. 4 is a cutaway, cross-sectional view of the supporting bracket and the monitor of FIG. 3, taken along the line IV-IV.

The installation member 20 comprises a supporting board 21 and an installation portion 23 connected to the supporting board 21. The supporting board 21 is configured to secure the monitor 5. An installation hole 231 is defined in the installation portion 23. The installation portion 23 defines a threaded hole 233 communicating with the installation hole 231. Two cutouts 235 (shown in FIG. 4) are defined in opposite edges of the installation portion 23. In one embodiment, a diameter of the installation hole 231 is greater than a diameter of the pole 13.

The blocking member 30 comprises a stopping portion 31 and a blocking portion 33 connected to the stopping portion 31. In one embodiment, the blocking portion 33 is a hollow column. A first protrusion 311 and a second protrusion 313 (shown in FIG. 4) are located on the stopping portion 31 and connected to the blocking portion 33. In one embodiment, the first protrusions 311 and the second protrusion 313 are mirror images. The blocking portion 33 defines a gap 331 in a first side thereof, and the blocking portion 33 defines a slot 333 in a second side that is opposite to the first side. A circular flange 335 is located on a sidewall of the blocking portion 33. A plurality of the engaging pieces 337 extend from the blocking portion 33.

The clamping member 40 comprises a holding portion 41, a latching portion 43 extending from the holding portion 41, a first holding piece 45 and a second holding piece 47. In one embodiment, the holding portion 41 is a hollow column, and a diameter of the holding portion 41 is smaller than a diameter of the installation hole 231. The first holding piece 45 and the second holding piece 47 extend from opposite sides of the holding portion 41. In one embodiment, the first holding piece 45 is substantially parallel to the second holding piece 47.

The resilient member 50 defines a nick 51. In one embodiment, the resilient member 50 is substantially semi cylindrical.

Figure 3:
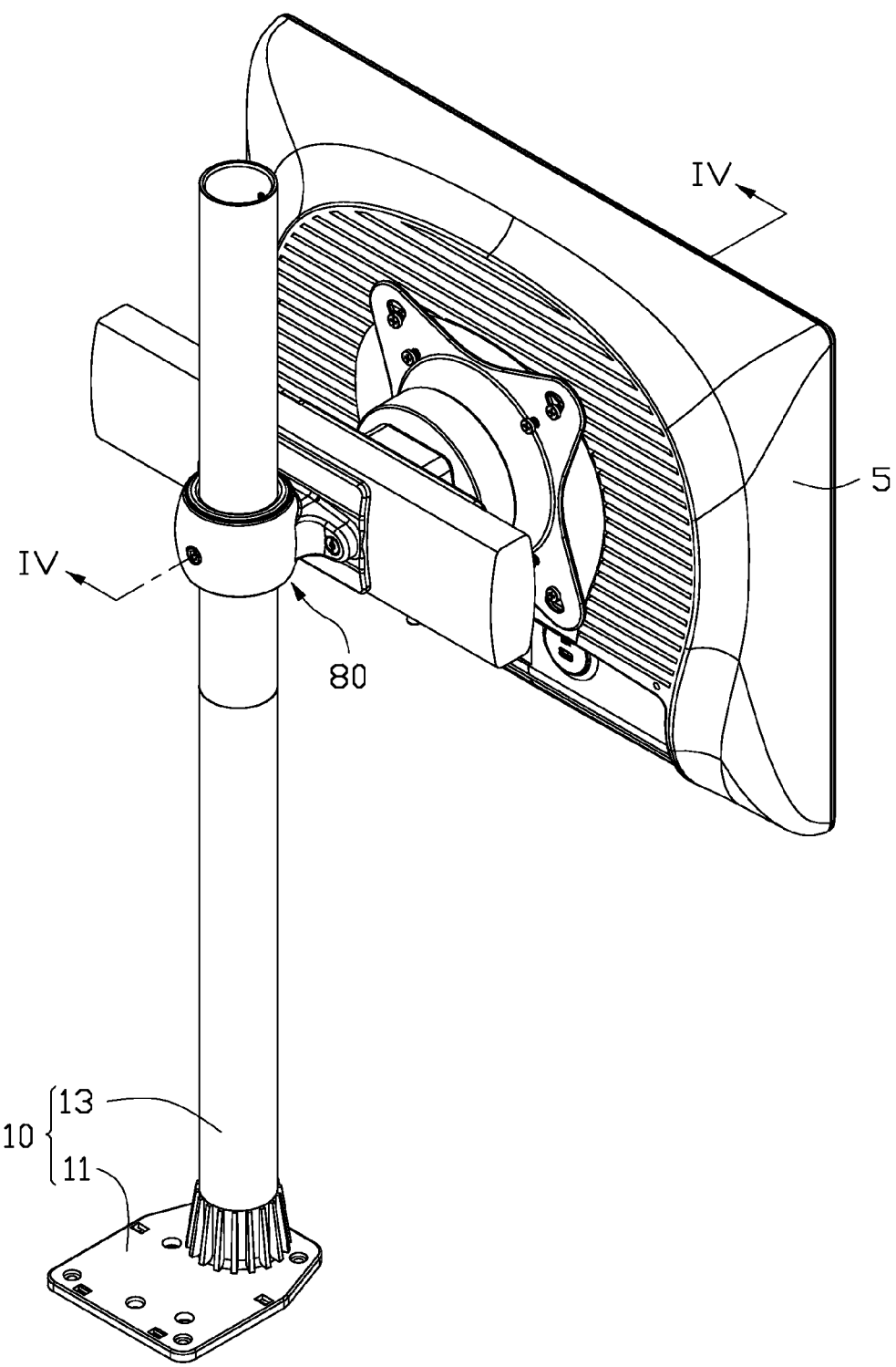
FIG. 3 is an assembled view of the supporting bracket and the monitor of FIG. 1.

FIG. 3, shows in assembly, the plurality of engaging pieces 337 engaged with the holding portion 41, and the holding portion 41 abutting the flange 335. The first holding piece 45 is received in the gap 331, and the second holding piece 47 is engaged in the slot 333. The resilient member 50 is placed in the stopping portion 31 and abuts the blocking portion 33. The first protrusion 311 is engaged in the nick 51. The clamping member 40 extends through the installation hole 231, until the latching portion 43 abuts a first end of the installation portion 23, and the stopping portion 31 abuts a second end opposite to the first end of the installation portion 23. The first protrusion 311 and the second protrusion 313 are engaged in the two cutouts 235. The resilient member 50 is located between an inside wall of the installation portion 23 and the first holding piece 45. The control member 60 is installed in the threaded hole 233.

In assembly of the control structure 80 and the stand 10, the pole 13 extends through the installation hole 231. The holding portion 41 and the blocking portion 33 abut the pole 13. The control structure 80 is capable of being slid along the pole 13 and configured to be rotated around the pole 13. The control member 60 is rotated to move towards the resilient member 50, until the control member 60 resists the resilient member 50 to be elastically deformed to press the first holding piece 45. The clamping member 40 is tightened to increase friction between the clamping member 40 and the pole 13, preventing the control structure 80 from moving relative to the pole 13. The monitor 5 is thereby installed on the stand 10.

The control member 60 is rotated to move away the resilient member 50. The resilient member 50 elastically returns to reduce the friction between the clamping member 40 and pole 13. The control structure 80 can be slid or rotated relative to the pole 13.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A supporting bracket comprising:

a stand comprising a pole; and a control structure, the control structure comprising an installation member, a clamping member, a resilient member, and a control member; the installation member comprising an installation portion, the installation portion defining an installation hole, the clamping member engaged in the installation hole and abutting the pole, the resilient member located between the installation portion and the clamping member, the control member received in the installation member, and the control member is rotatable relative to the installation member to resist or disengage from the resilient member, and the resilient member is resiliently deformable to abut the clamping member to change a friction between the pole and the clamping member;

the control structure further comprises a blocking member engaged in the installation hole, and the blocking member is engaged with the clamping member;

the clamping member further comprises a first holding piece and a second holding piece that is parallel to the first holding piece, the blocking member comprises a blocking portion, a gap and a slot are defined in the blocking portion, the first holding piece is received in the gap, and the second holding piece is engaged in the slot;

the clamping member comprises a holding portion and a latching portion extending from the holding portion, the blocking member further comprises a stopping portion connected to the blocking portion, the latching portion abuts a first end of the installation portion, and the stopping portion abuts a second end opposite to the first end of the installation portion;

a first protrusion and a second protrusion, and two cutouts defined in two opposite edges of the installation hole, the first and the second protrusions being located on the stopping portion, each of the first protrusion and the second protrusion being engaged in each of the two cutouts; and the resilient member defines a nick, and the first protrusion is engaged in the nick.

2. The supporting bracket of claim 1, further comprising a flange extending from the blocking portion, and the flange abuts the holding portion.

3. The supporting bracket of claim 1, wherein the resilient member is substantially semi-cylindrical and abuts the blocking portion.

4. The supporting bracket of claim 1, wherein the installation portion defines a threaded hole communicating with the installation hole, and the control member is rotatably engaged in the threaded hole.

5. The supporting bracket of claim 1, wherein the installation member further comprises a supporting board connected to the installation portion, and the supporting board is configured to secure a monitor.

* * * * *